(12) United States Patent
Cowin

(10) Patent No.: US 7,844,759 B1
(45) Date of Patent: Nov. 30, 2010

(54) SYSTEM, METHOD, AND COMPUTER READABLE MEDIUM FOR PROCESSING A MESSAGE QUEUE

(76) Inventor: Gregory L. Cowin, 3925 Veneto Dr., Frisco, TX (US) 75034

( * ) Notice: Subject to any disclaimer, the term of this patent is extended or adjusted under 35 U.S.C. 154(b) by 3 days.

(21) Appl. No.: 11/495,053

(22) Filed: Jul. 28, 2006

(51) Int. Cl.
*G06F 3/00* (2006.01)
*G06F 9/44* (2006.01)

(52) U.S. Cl. .................... 710/52; 717/100
(58) Field of Classification Search .............. 710/52
See application file for complete search history.

(56) References Cited

U.S. PATENT DOCUMENTS

| | | | |
|---|---|---|---|
| 4,714,995 A | 12/1987 | Materna et al. | |
| 5,465,111 A | 11/1995 | Fukushima et al. | |
| 5,495,533 A | 2/1996 | Linehan et al. | |
| 5,524,253 A | 6/1996 | Pham et al. | |
| 5,604,800 A | 2/1997 | Johnson et al. | |
| 5,675,711 A | 10/1997 | Kephart et al. | |
| 5,721,912 A | 2/1998 | Stepczyk et al. | |
| 5,778,395 A | 7/1998 | Whiting et al. | |
| 5,812,997 A | 9/1998 | Morimoto et al. | |
| 5,859,911 A | 1/1999 | Angelo et al. | |
| 5,930,798 A | 7/1999 | Lawler et al. | |
| 5,944,783 A * | 8/1999 | Nieten | 709/202 |
| 5,982,891 A | 11/1999 | Ginter et al. | |
| 5,999,964 A * | 12/1999 | Murakata et al. | 709/201 |
| 6,055,562 A | 4/2000 | Devarakonda et al. | |
| 6,065,040 A | 5/2000 | Mima et al. | |
| 6,088,689 A | 7/2000 | Kohn et al. | |
| 6,113,650 A | 9/2000 | Sakai | |
| 6,134,580 A | 10/2000 | Tahara et al. | |
| 6,134,660 A | 10/2000 | Boneh et al. | |
| 6,154,777 A | 11/2000 | Ebrahim | |
| 6,172,986 B1 | 1/2001 | Watanuki et al. | |
| 6,199,195 B1 | 3/2001 | Goodwin et al. | |
| 6,202,060 B1 | 3/2001 | Tran | |
| 6,209,124 B1 | 3/2001 | Vermeire et al. | |
| 6,230,309 B1 | 5/2001 | Turner et al. | |
| 6,233,601 B1 | 5/2001 | Walsh | |
| 6,256,773 B1 | 7/2001 | Bowman-Amuah | |
| 6,272,478 B1 | 8/2001 | Obata et al. | |
| 6,282,563 B1 | 8/2001 | Yamamoto et al. | |
| 6,282,697 B1 | 8/2001 | Fables et al. | |
| 6,304,556 B1 | 10/2001 | Haas | |
| 6,314,555 B1 * | 11/2001 | Ndumu et al. | 717/101 |

(Continued)

FOREIGN PATENT DOCUMENTS

JP 2005190103 7/2005

OTHER PUBLICATIONS

Emmerich, et al., "TIGRA—An Architectural Style for Enterprise Application Integration", *IEEE* (Jul. 2001), p. 567-576.

(Continued)

*Primary Examiner*—Henry W Tsai
*Assistant Examiner*—Titus Wong

(57) ABSTRACT

A method, system, and computer readable medium for processing a message queue comprises processing messages in the queue in a serial manner, suspending a message, when the processing is blocked for the message, processing a next message in the queue during the suspension, continuing the processing of the messages until the processing is unblocked, placing the message back in the queue, and processing the message.

34 Claims, 1 Drawing Sheet

U.S. PATENT DOCUMENTS

| | | |
|---|---|---|
| 6,330,677 B1 | 12/2001 | Madoukh |
| 6,343,265 B1 | 1/2002 | Glebov et al. |
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,442,537 B1 | 8/2002 | Karch |
| 6,452,910 B1 | 9/2002 | Vij et al. |
| 6,477,372 B1 | 11/2002 | Otting |
| 6,496,871 B1 | 12/2002 | Jagannathan et al. |
| 6,519,653 B1 * | 2/2003 | Glass ........................ 719/317 |
| 6,611,516 B1 | 8/2003 | Pirkola et al. |
| 6,629,128 B1 | 9/2003 | Glass |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,738,975 B1 | 5/2004 | Yee et al. |
| 6,879,570 B1 | 4/2005 | Choi |
| 6,895,391 B1 | 5/2005 | Kausik |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 | 10/2005 | Lewallen |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,259 B2 | 10/2006 | Ueda et al. |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,228,141 B2 | 6/2007 | Sethi |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 | 3/2009 | Tai et al. |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 | 1/2010 | Watanuki et al. |
| 7,660,777 B1 | 2/2010 | Hauser |
| 7,660,780 B1 | 2/2010 | Patoskie |
| 7,664,721 B1 | 2/2010 | Hauser |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 | 10/2010 | Lipari et al. |
| 2001/0029526 A1 | 10/2001 | Yokoyama et al. |
| 2001/0051515 A1 | 12/2001 | Rygaard |
| 2001/0056425 A1 | 12/2001 | Richard |
| 2002/0032783 A1 | 3/2002 | Tuatini |
| 2002/0035429 A1 | 3/2002 | Banas |
| 2002/0091680 A1 | 7/2002 | Hatzis et al. |
| 2002/0115445 A1 | 8/2002 | Myllymaki |
| 2002/0116454 A1 | 8/2002 | Dyla et al. |
| 2002/0159479 A1 | 10/2002 | Watanuki et al. |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 | 3/2003 | Coleman et al. |
| 2003/0055898 A1 | 3/2003 | Yeager et al. |
| 2003/0070071 A1 | 4/2003 | Riedel et al. |
| 2003/0101441 A1 | 5/2003 | Harrison et al. |
| 2003/0177170 A1 | 9/2003 | Glass |
| 2003/0191797 A1 | 10/2003 | Gurevich et al. |
| 2003/0191969 A1 | 10/2003 | Katsikas |
| 2003/0225789 A1 | 12/2003 | Bussler et al. |
| 2003/0225935 A1 | 12/2003 | Rivard et al. |
| 2004/0003243 A1 | 1/2004 | Fehr et al. |
| 2004/0015539 A1 | 1/2004 | Alegria et al. |
| 2004/0037315 A1 | 2/2004 | Delautre et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0088369 A1 | 5/2004 | Yeager et al. |
| 2004/0111730 A1 | 6/2004 | Apte |
| 2004/0133656 A1 | 7/2004 | Butterworth et al. |
| 2004/0148073 A1 | 7/2004 | Hawig et al. |
| 2004/0172614 A1 | 9/2004 | Gallagher |
| 2004/0194072 A1 | 9/2004 | Venter |
| 2004/0202165 A1 * | 10/2004 | Aoki et al. .................. 370/392 |
| 2004/0220952 A1 | 11/2004 | Cheenath |
| 2004/0221292 A1 | 11/2004 | Chiang et al. |
| 2005/0114832 A1 | 5/2005 | Manu |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 | 11/2005 | Kress et al. |
| 2005/0281363 A1 | 12/2005 | Qi et al. |
| 2006/0005177 A1 | 1/2006 | Atkin et al. |
| 2006/0031850 A1 | 2/2006 | Falter et al. |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 * | 4/2006 | Armstrong et al. .......... 714/100 |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1 | 6/2006 | Cottrell et al. |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256008 A1 | 11/2006 | Rosenberg |
| 2006/0272002 A1 | 11/2006 | Wightman et al. |

| | | |
|---|---|---|
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |
| 2010/0235459 A1 | 9/2010 | Wheeler |

OTHER PUBLICATIONS

Bussler, Christoph "The Role of B2B Engines in B2B Integration Architectures", *ACM*, (Mar. 2002),67-72.

Jandl, et al., "Enterprise Application Integration by means of a generic CORBA LDAP Gateway", *ACM*, (May 2002),711.

Sutherland, et al., "Enterprise Application Integration and Complex Adaptive Systems", *ACM*, (Oct. 2002),59-64.

Ballance, et al., "The Pan Language-Based Editing System For Integrated Development Environments", *ACM*, (Oct. 1990),77-93.

Dilts, et al., "An Inteligent Interface to CIM Multiple Data Bases", *ACM, TALIP*, (Mar. 2004),vol. 3 Issue 1, pp. 491-509.

"Non Final Office Action", U.S. Appl. No. 11/086,211, 25 pages.

"Requirement for Restriction/Election", U.S. Appl. No. 11/086,102, (Apr. 6, 2009),7 pages.

"Non Final Office Action", U.S. Appl. No. 10/975,827, (Apr. 7, 2009),38 pages.

"Final Office Action", U.S. Appl. No. 11/086,120, (Apr. 14, 2009),48 pages.

"Non Final Office Action", U.S. Appl. No. 11/645,292, (Apr. 17, 2009),40 pages.

"Final Office Action", U.S. Appl. No. 11/052,680, (Feb. 13, 2009),117 pages.

Flanagan, Roxy "Graphic+Internet related tutorials Using Winzip", indexed by www.archive.org,(Oct. 30, 2008),8 pages.

"Non Final Office Action", U.S. Appl. No. 11/645,190, (Mar. 13, 2009),41 pages.

"Non Final Office Action", U.S. Appl. No. 11/645,291, (Mar. 13, 2009),41 pages.

"Non Final Office Action", U.S. Appl. No. 11/645,193, (Mar. 16, 2009),41 pages.

"Notice of Allowance", U.S. Appl. No. 11/086,101, (Mar. 23, 2009),20 pages.

"Non Final Office Action", U.S. Appl. No. 11/052,680, (May 6, 2009),28 pages.

"Non Final Office Action", U.S. Appl. No. 11/645,300, (May 11, 2009),21 pages.

"Non Final Office Action", U.S. Appl. No. 11/645,302, (May 11, 2009),21 pages.

"Stuffit Deluxe", Aladdin Systems,(Jan. 1, 2004),83 pages.

Gu, T. et al., "Toward an OSGi-based infrastructure for context-aware applications", U.S. Appl. No. 11/645,190, Pervasive Computing IEEE, vol. 3, Issue 4, Digital Object Identifier 10.1109/MPRV.2004.19,(Oct.-Dec. 2004), 9 pages.

Pantic, M et al., "Simple agent framework: an educational tool introducing the basics of AI programming", U.S. Appl. No. 11/645,190, Information Technology: Research and Education, 2003. Proceedings, ITRE2003.,(Aug. 11-13, 2003),426-430.

Singh, V.K. et al., "DYSWIS: An architecture for automated diagnosis of networks", U.S. Appl. No. 11/645,190, Operations and Management Symposium, 2008. NOMS 2008. IEEE,(Apr. 7-11, 2008),851-854.

"Non Final Office Action", U.S. Appl. No. 10/975,146, (May 26, 2009),21 pages.

"Advisory Action", U.S. Appl. No. 11/086,121, (Sep. 11, 2009), 3 pages.

"Final Office Action", U.S. Appl. No. 11/052,680, (Oct. 5, 2009), 16 pages.

"Final Office Action", U.S. Appl. No. 11/086,211, (Sep. 29, 2009), 18 pages.

"Non Final Office Action", U.S. Appl. No. 11/086,102, (Jun. 2, 2009), 15 pages.

"Non Final Office Action", U.S. Appl. No. 11/086,120, (Aug. 13, 2009), 35 pages.

"Non Final Office Action", U.S. Appl. No. 11/086,121, (Jun. 22, 2009), 26 pages.

"Non Final Office Action", U.S. Appl. No. 11/645,306, (Jun. 4, 2009), 15 pages.

"Notice of Allowance", U.S. Appl. No. 11/645,190, (Sep. 17, 2009), 8 pages.

"Notice of Allowance", U.S. Appl. No. 11/645,193, (Sep. 17, 2009), 8 pages.

"Notice of Allowance", U.S. Appl. No. 11/645,291, (Oct. 1, 2009), 11 pages.

"Restriction Requirement", U.S. Appl. No. 10/975,623, (Jun. 9, 2009), 6 pages.

Praet, et al., "Processor Modeling and Code Selection for Retargetable Compilation", Jul. 2001, *ACM, TODAES* vol. 6, Issue 3, (Jul. 2001), pp. 277-307.

"Final Office Action", U.S. Appl. No. 11/086,120, (Feb. 23, 2010), 43 pages.

"Non-Final Office Action", U.S. Appl. No. 11/052,680, (Feb. 4, 2010), 12 pages.

"Non-Final Office Action", U.S. Appl. No. 11/086,101, (Sep. 2, 2009), 20 pages.

"Non-Final Office Action", U.S. Appl. No. 11/086,121, (Dec. 30, 2009), 25 pages.

"Non-Final Office Action", U.S. Appl. No. 11/439,059, (Oct. 30, 2009), 9 pages.

"Non-Final Office Action", U.S. Appl. No. 11/645,197, (Feb. 24, 2010), 13 pages.

"Non-Final Office Action", U.S. Appl. No. 11/645,301, (Jan. 6, 2010), 25 pages.

"Non-Final Office Action", U.S. Appl. No. 11/645,303, (Feb. 8, 2010), 18 pages.

"Non-Final Office Action", U.S. Appl. No. 10/975,623, (Nov. 12, 2009), 8 pages.

"Notice Of Allowance", U.S. Appl. No. 10/975,623, (Feb. 23, 2010), 9 pages.

"Notice Of Allowance", U.S. Appl. No. 11/086,101, (Feb. 25, 2010), 9 pages.

"Notice Of Allowance", U.S. Appl. No. 11/645,292, (Nov. 17, 2009), 9 pages.

"Notice Of Allowance", U.S. Appl. No. 11/645,300, (Nov. 18, 2009), 9 pages.

"Notice Of Allowance", U.S. Appl. No. 11/645,302, (Nov. 17, 2009), 8 pages.

"Notice Of Allowance", U.S. Appl. No. 11/645,306, (Nov. 17, 2009), 8 pages.

"Restriction Requirement", U.S. Appl. No. 11/645,191, (Jan. 28, 2010), 7 pages.

"Restriction Requirement", U.S. Appl. No. 11/645,192, (Jan. 28, 2010), 6 pages.

"Restriction Requirement", U.S. Appl. No. 11/645,198, (Jan. 28, 2010), 6 pages.

"Restriction Requirement", U.S. Appl. No. 11/645,200, (Feb. 26, 2010), 8 pages.

Blackwell, John "Ramit—Rule-Based Alert Management Information Tool", *Thesis, Florida State University College of Arts and Sciences*, (2004), pp. 1-69.

Forte, "Feature Comparison of Agent and Free Agent", Retrieved from: <www.forteinc.com/agent/features.php> on Jan. 26, 2010, (2002),3 pages.

Lockemann, Peter C., "Agents and Databases: Friends or Foes?", *Proceedings of the 9th International Database Engineering & Application Symposium (IDEAS '05)*, (2005), 11 pages.

Russell, Stuart et al., "Artificial Intelligence: A Modern Approach", *Pearson*, (2003), pp. 5, 32-56, 449-454.

Stallings, William "ISDN and Broadband ISDN with Framw Relay and ATM", *Prentice-Hall*, (1999), p. 516.

"Final Office Action", U.S. Appl. No. 11/086,102, (Oct. 20, 2009), 13 pages.

"Final Office Action", U.S. Appl. No. 10/975,827, (Nov. 23, 2009), 17 pages.
"Final Office Action", U.S. Appl. No. 10/975,146, (Dec. 1, 2009), 11 pages.
"Advisory Action", U.S. Appl. No. 11/086,120, (May 4, 2010), 3 pages.
"Final Office Action", U.S. Appl. No. 11/645,301, (May 12, 2010), 32 pages.
"Non Final Office Action", U.S. Appl. No. 10/975,827, (Mar. 25, 2010), 19 pages.
"Non Final Office Action", U.S. Appl. No. 11/439,059, (Mar. 26, 2010), 6 pages.
"Non Final Office Action", U.S. Appl. No. 11/645,191, (May 5, 2010), 17 pages.
"Non Final Office Action", U.S. Appl. No. 11/645,192, (May 4, 2010), 14 pages.
"Non Final Office Action", U.S. Appl. No. 11/645,194, (Mar. 26, 2010), 26 pages.
"Non Final Office Action", U.S. Appl. No. 11/645,196, (Apr. 28, 2010), 32 pages.
"Non Final Office Action", U.S. Appl. No. 11/645,198, (Apr. 12, 2010), 14 pages.
"Non-Final Office Action", U.S. Appl. No. 11/645,195, (Apr. 15, 2010), 20 pages.
Adnan, Syed et al., "A Survey of Mobile Agent Systems", CSE 221, Final Project, Jun. 13, 2000., 12 pages.
Baumann, J. et al., "Mole 3.0: A Middleware for Java-Based Mobile Software Agents", (1998), 18 pages.
Bigus, J.P. et al., "ABLE: A toolkit for building multiagent autonomic systems", IBM Systems Journal, vol. 41, No. 3, 2002., 22 pages.
Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.l,(Aug. 2002), 4 pages.
Bursell, Michael et al., "Comparison of autonomous mobile agent technologies", (May 12, 1997), 28 pages.
Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.
Hasegawa, Tetsou et al., "Inoperability for mobile agents by incarnation agents", AAMAS; Melbourne, Australia., (Jul. 14, 2003), 2 pages.
Jih, Wan-Rong et al., "Context-aware Access Control in Pervasive Healthcare", Computer Science and Information Engineering, National Taiwan University, Taiwan. jih@agents.csie.ntu.edu.tw., {r93070, yjshu} @csie.ntu.edu.tw,(2005), 8 pages.
Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.
Qui-Sheng, He et al., "A Lightweight Architecture to Support Context-Aware Ubiquitous Agent Systems", Department of Computer Science and Engineering, Fudan University, Shanghai 200433, Chain {hequisheng, sltu} @fudan.edu.cn,(Aug. 2006), 6 pages.
Sterritt, Roy et al., "From Here to Autonomicity: Self-Managing Agents and the Biological Metaphors that Inspire Them", (Jun. 2005), 8 pages.
Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk.,(Aug. 2006), 10 pages.
"Final Office Action", U.S. Appl. No. 11/086,121, (Jun. 16, 2010), pp. 1-30.
"Final Office Action", U.S. Appl. No. 11/052,680, (May 17, 2010), 12 pages.
"Final Office Action", U.S. Appl. No. 11/645,303, (May 21, 2010), 32 pages.

"Non Final Office Action", U.S. Appl. No. 11/645,200, (May 26, 2010), 34 pages.
Bagci, et al., "Communication and Security Extensions for a Ubiquitous Mobile Agent System (UbiMAS)", In Proceedings of CF 2005, Available at <http://portal.acm.org/ft_gateway.cfm?id=1062302&type=pdf&coll=GUIDE&dl=GUIDE&CFID=91857573&CFTOKEN=53726080>,(May 2005), pp. 246-251.
Brandt, Raimund "Dynamic Adaptation of Mobile Code in Heterogenous Environments", Der Teschnischen Universitat Munchen,(Feb. 15, 2001), 76 pages.
Karnik, Neeran M., et al., "Security in the Ajanta Mobile Agent System", Softw. Pract. Exper. 31, 4 (Apr. 2001), 301-329,(2001), 28 pages.
Korba, Larry "Towards Secure Agent Distribution and Communication", In Proceedings of the 32nd Annual Hawaii International Conference on System Science—vol. 8 (Jan. 5-8, 1999). HICSS. IEEE Computer Society, Washington, DC, 8059.,(1999), 10 pages.
Poggi, Agostino et al., "Security and Trust in Agent-Oriented Middleware", OTM Workshops 2003: 989-1003,(2003), 15 pages.
Walsh, Tom et al., "Security and Reliability in Concordia", In Mobility: Processes, Computers, and Agents ACM Press/Addison-Wesley Publishing Co., New York, NY, 524-534.,(1999), 10 pages.
"Advisory Action", U.S. Appl. No. 11/052,680, (Jul. 28, 2010), 3 pages.
"Advisory Action", U.S. Appl. No. 11/645,303, (Jul. 28, 2010), 3 pages.
"Final Office Action", U.S. Appl. No. 10/975,827, (Sep. 15, 2010), 22 pages.
"Final Office Action", U.S. Appl. No. 11/086,102, (Jul. 1, 2010), 14 pages.
"Final Office Action", U.S. Appl. No. 11/645,192, (Sep. 15, 2010), 14 pages.
"Final Office Action", U.S. Appl. No. 11/645,194, (Sep. 15, 2010), 28 pages.
"Final Office Action", U.S. Appl. No. 11/645,197, (Jul. 19, 2010), 16 pages.
"Final Office Action", U.S. Appl. No. 11/645,198, (Sep. 16, 2010), 22 pages.
"Non Final Office Action", U.S. Appl. No. 11/645,301, (Jul. 30, 2010), 18 pages.
"Non Final Office Action", U.S. Appl. No. 11/645,303, (Aug. 19, 2010), 20 pages.
"Non-Final Office Action", U.S. Appl. No. 12/647,964, (Sep. 8, 2010), 5 pages.
"Notice of Allowability", U.S. Appl. No. 10/975,146, (Jul. 13, 2010), 2 pages.
"Notice of Allowance", U.S. Appl. No. 11/439,059, (Jul. 14, 2010), 12 pages.
"The Sims", Sims, Electronic Arts, (2000), 57 pages.
"Wow, World of Warcraft", Wikipedia (online), Retreived from Internet in 2010, <URL:http://en.wikipedia.orq/wiki/World of Warcraft>, (2010), 28 pages.
Barba, Rick "The Sims Prima's Official Strategy Guide", Prima Publishing; ISBN: 7615-2339-1, (2000), 98 Pages.
Chang, Yao-Chung et al., "All-IP Convergent Communications over Open Service Architecture", 2005 Wireless Telecommunications Symposium, IEEE, 0-7803-8856, (2005), pp. 202-210.
Erfurth, Christian et al., "Migration Intelligence for Mobile Agents", Cited by examiner in US Application 11/645,192 on Sep. 15, 2010, (2001), 8 pages.
Hinchey, Michael G., et al., "Formal Approaches to Agent-Based Systems", 2nd International Workshop FAABS, (Oct. 2002), 291 pages.
Rosenberg, Jonathan et al., "Programming Internet Telephony Services", IEEE Network, (May/Jun. 1999), 8 pages.
Taylor, T.L. "Does WoW Change Everything?", Games and Culture, vol. 1, No. 4, (Oct. 2006), 20 pages.

"Final Office Action", U.S. Appl. No. 11/645,196, (Sep. 22, 2010), 33 pages.

"Notice of Allowance", U.S. Appl. No. 12/714,753, (Sep. 27, 2010), 7 pages.

"Advisory Action", U.S. Appl. No. 11/645,197, (Oct. 6, 2010), 3 pages.

"Notice of Allowance", U.S. Appl. No. 11/086,121, (Oct. 7, 2010), 6 pages.

"Notice of Allowance", U.S. Appl. No. 11/645,195, (Oct. 7, 2010), 8 pages.

* cited by examiner

SYSTEM, METHOD, AND COMPUTER READABLE MEDIUM FOR PROCESSING A MESSAGE QUEUE

BACKGROUND OF THE INVENTION

The present invention is related to message processing, and, more specifically to processing a message queue utilizing a software or computer agent.

The term "agent" describes a software abstraction, an idea, or a concept and provides a convenient and powerful way to describe a complex software entity that is capable of acting with a certain degree of autonomy in order to accomplish tasks on behalf of its user. But unlike objects, which are defined in terms of methods and attributes, an agent is defined in terms of its behavior. An autonomous software agent is a stand-alone computer program that performs tasks on behalf of a controlling entity, but without direct, continuous supervision. The autonomous agent may utilize network resources and services, but works relatively independently of other software agents that may be a part of a multi-agent system.

Since agents are well suited to include their required resources in their description, they can be designed to be very loosely coupled and it becomes easy to have them executed as independent threads and on distributed processors. Thus they become distributed agents and the considerations of distributed computing apply. Agent code is particularly easy to implement in a distributed fashion and scales well.

With distributed agent systems, it is desirable for an agent to process only one message at a time so that data integrity is maintained and race conditions are avoided. In such a situation, problems arise when, during the processing of a message, blocking occurs because of another message sent to another agent causing the agent to become unresponsive for some period of time. This period can sometimes be in the seconds or even minutes. Therefore, what is needed is a solution that overcomes these problems and limitations.

SUMMARY OF THE INVENTION

The present invention provides a system, method, and computer readable medium for processing messages in a message queue. A message is the basic unit of data sent from one software agent to another or from a sender to its recipients. The structure of the message is defined in service descriptions by a message description language. A message is defined as a construct that can include zero or more headers, an envelope, data within the envelope and data external to the envelope. The header part of a message can include information pertinent to extended services functionality, such as security, transaction context, orchestration information, message routing information, or management information. The data part of a message contains the message content or URIs to the actual data resource.

With the present invention, if an agent becomes unresponsive for some period of time because of a particular message, that message is suspended (for example, if processing is taking too long or if processing is blocked). When the message is unblocked the message is placed back onto the queue for later processing. Once the message is reached in the queue for processing, the processing is released from the point where it was suspended. With unblocking asynchronous processing for computer agents, agent systems become highly available, improving overall processing of messages and increasing overall performance and availability.

In one embodiment, a method for processing a message queue comprises processing messages in the queue in a serial manner, suspending a message, when the processing is blocked for the message, processing a next message in the queue during the suspension, continuing the processing of the messages until the processing is unblocked, placing the message back in the queue, and processing the message.

In another embodiment, a system comprises message queues and autonomous computer agents sending self-contained messages to each other from each of their respective message queues, wherein the messages are processed serially, wherein a message is suspended: when the processing is blocked for the message and until an inner send is completed.

In a further embodiment, a computer readable medium comprises instructions for: suspending a message in a queue, when processing is blocked for the message, processing a next message in the queue during the suspension, continuing the processing of the messages until the processing is unblocked, placing the message back in the queue, and when the message is reached in the queue, processing the message.

DETAILED DESCRIPTION OF THE INVENTION

Figure 1:
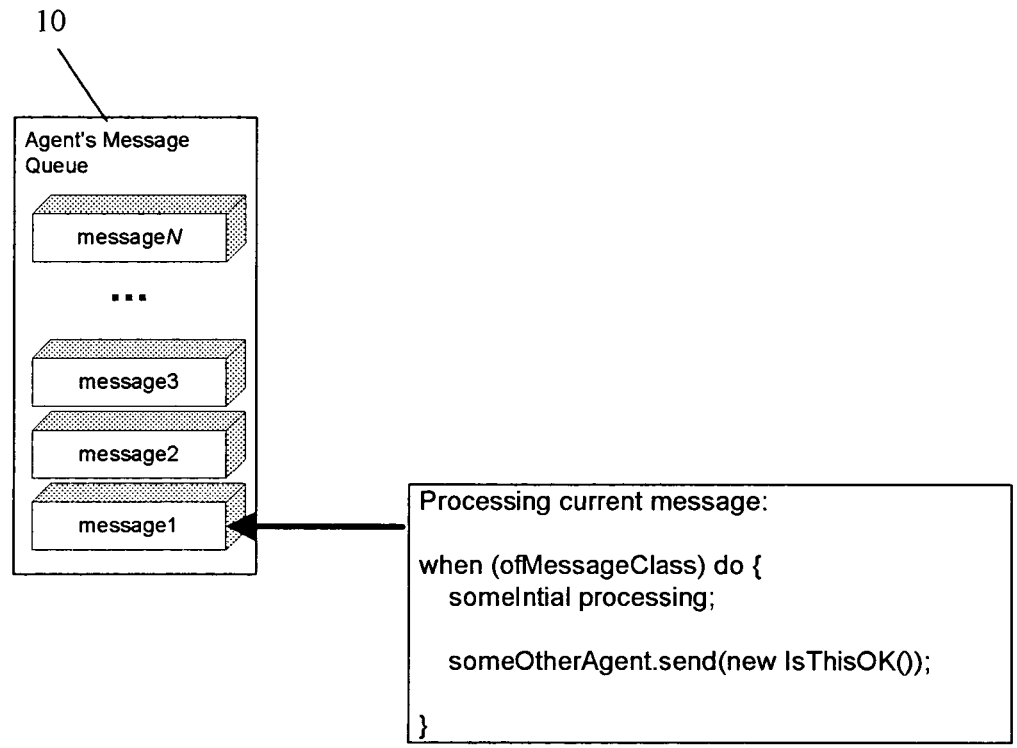
FIG. 1 depicts a multi-agent system consisting of autonomous computer agents sending self-contained messages to each other in accordance with a preferred embodiment of the present invention.

FIG. 1 depicts an agent's message queue 10 in a multi-agent system consisting of autonomous computer agents sending self-contained messages to each other. The agent's queue 10 comprises messages 1 through N which are processed serially. In this case, a message is sent synchronously via the following signature: Reply send (aMessage), where aMessage is a self-contained message that can be sent outside the bounds of a process and Reply is the self-contained message with possible changes and results contained within it. Any asynchronous message can be made synchronous by waiting for a reply before allowing execution to continue. Therefore, the send method is blocked until the receiving agent reaches the message and the message is processed.

In order for the agent to properly process messages without deadlock or race conditions, only a single message is allowed to be processed from the queue 10 at a time. In this case, if the message calls another agent during the processing and therefore blocks, the agent is unable to process messages until a reply is received. If the message blocks for some longer period of time, the agent is unavailable to process other messages in the queue. Therefore, the computer agent becomes less available.

Figure 2:
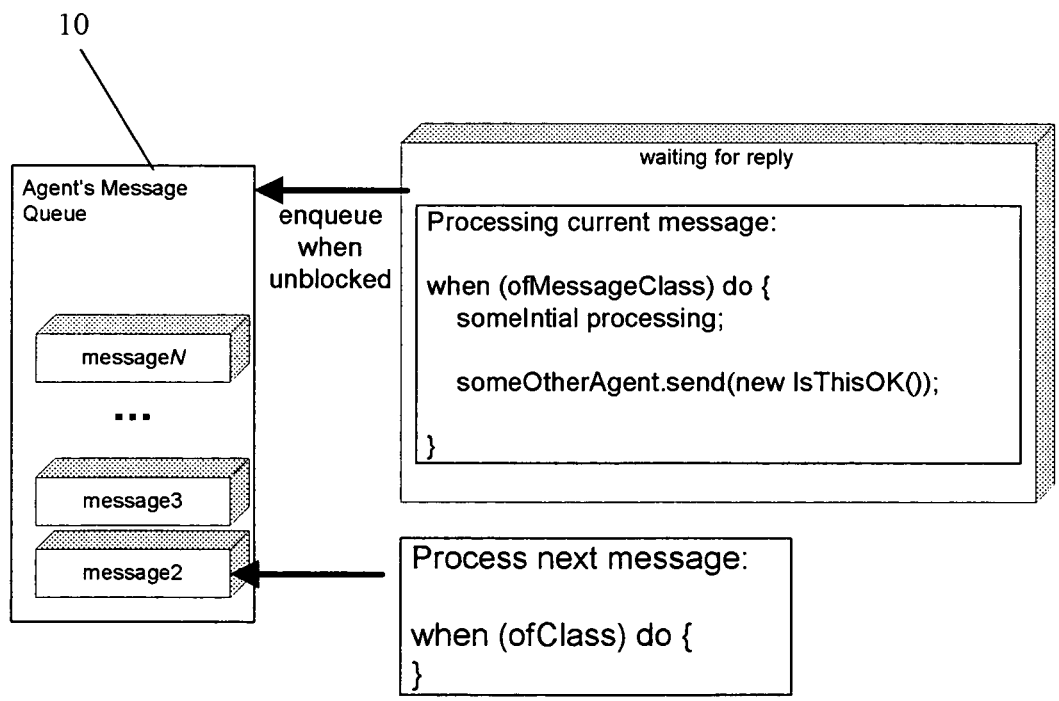
FIG. 2 depicts a suspended processing of a current message in accordance with a preferred embodiment of the present invention.

Referring now to FIG. 2, The present invention suspends processing of the current (blocked) message until the inner send( ) is completed. Once completed, the message is placed back onto the queue 10 for later processing. Once the message is reached, it is released( ) to continue processing. This novel method for processing queued messages allows for the autonomous computer agent to be more available and not blocked during its own calls to other agents while ensuring that only one message is processed at a time.

In one embodiment of the present invention, a method for processing a message queue comprises processing messages in the queue in a serial manner, suspending a message, when the processing is blocked for the message, processing a next message in the queue during the suspension, continuing the processing of the messages until the processing is unblocked, placing the message back in the queue, and processing the message.

In the method, a software agent is processing the messages, wherein the software agent may send another message to another software agent. The processing may be blocked based on at least one of: a non-reply to the processing of the messages, an input/output block (for example, a block while attempting to connect to a socket), and a time-out. The processing is unblocked based on receiving a reply from an intended destination, wherein the intended destination is at least one of: a software agent, and an input/output port.

The method further comprises wrapping the message in another message intended for special processing, when the processing is unblocked, wrapping the message in another message intended for special processing, when the message is placed in the queue, wherein the message intended for special processing releases a thread of execution of the message. The processing of the messages is continued in the queue in the serial manner after the processing of the message.

In another embodiment of the present invention, a system comprises message queues and autonomous computer agents sending self-contained messages to each other from each of their respective message queues, wherein the messages are processed serially, wherein a message is suspended: when the processing is blocked for the message and until an inner send is completed. Once the inner send is completed, the message is placed back onto the appropriate queue for later processing, wherein once the message is reached in the queue, it is released to continue processing, wherein an autonomous computer agent is not blocked during its own call to another agent while ensuring that only one message is processed at a time.

In a further embodiment of the present invention, a computer readable medium comprises instructions for: suspending a message in a queue, when processing is blocked for the message, processing a next message in the queue during the suspension, continuing the processing of the messages until the processing is unblocked, placing the message back in the queue, and when the message is reached in the queue, processing the message.

The computer readable medium also comprises continuing the processing of the messages in the queue in a serial manner after the processing of the message, wrapping the message in another message intended for special processing, when the processing is unblocked, wrapping the message in another message intended for special processing, when the message is placed in the queue, wherein the message is blocked if the message calls another agent during processing of the message, wherein an agent is unable to process messages until a reply is received.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A computer-implemented method for processing a message queue, comprising:
   processing messages in the message queue in a serial manner, wherein a message structure is defined in service descriptions by a message description language and processing a message comprises processing the message structure;
   suspending processing of at least a further message that is not in the message queue when the processing of the further message is blocked, the further message having a thread of execution, the further message having been previously removed from the message queue;
   processing one or more next messages in the message queue during suspension of the further message;
   responsive to the processing of the further message becoming unblocked, placing the further message back in the message queue; and
   resuming processing of the further message.

2. The computer-implemented method of claim 1, wherein the method is performed by a software agent.

3. The computer-implemented method of claim 2, wherein the software agent is configured to optionally send a message to another software agent.

4. The computer-implemented method of claim 1, wherein the processing of the further message is blocked based on at least one of:
   a non-reply to the processing of the further message;
   an input/output block; or
   a time-out.

5. The computer-implemented method of claim 1, wherein the processing of the further message unblocked based on receiving a reply from an intended destination.

6. The computer-implemented method of claim 5, wherein the intended destination is at least one of:
   a software agent; or
   an input/output port.

7. The computer-implemented method of claim 1 further comprising wrapping the further message in another message intended for special processing, when the processing of the further message is unblocked.

8. The computer-implemented method of claim 7, wherein said wrapping the further message occurs prior to placing the further message back in the message queue.

9. The computer-implemented method of claim 8, wherein the message intended for special processing releases the thread of execution of the further message.

10. The computer-implemented method of claim 1 further comprising continuing processing of messages in the message queue in a serial manner after processing the further message.

11. An article of manufacture including a non-transitory computer-readable medium having instructions stored thereon that, in response to execution by a computing device, cause the computing device to implement a system comprising:
   a plurality of message queues;
   a plurality of autonomous computer agents, wherein at least one of the autonomous computer agents contains one of the message queues, wherein the autonomous computer agents are configured to send self-contained messages to each other from their respective message queues;
   wherein the autonomous computer agents are configured to process the self-contained messages serially, wherein a self-contained message structure is defined in service descriptions by a message description language and to process a self-contained message comprises processing the self-contained message structure;
   wherein the autonomous computer agents are configured to suspend processing of at least one of the self-contained messages when processing of the at least one self-contained message is blocked and until an inner send is completed, the at least one self-contained message having a thread of execution, the inner send being a send of a message that originates from within the thread of execution; and wherein at least one of the autonomous computer agents is configured to place, once the inner send is completed, the at least one self-contained message back on to one of the message queues for later processing, the self-contained message having been previously removed from the one of the message queues.

12. The article of manufacture of claim 11, wherein at least one of the autonomous computer agents is configured to release, once the self-contained message is reached in the queue, the at least one self-contained message to continue processing.

13. The article of manufacture of claim 12, wherein at least one of the autonomous computer agents is configured to not be blocked during the at least one autonomous computer agent's own call to another autonomous computer agent while ensuring that only one self-contained message is processed at a time.

14. A tangible non-transitory computer-readable medium having stored thereon, computer-executable instructions that, in response to execution by a computing device, cause the computing device to perform operations comprising:

suspending processing of at least one message when processing of the message is blocked, the message having a thread of execution, the message having been previously removed from a queue, wherein a message structure is defined in service descriptions by a message description language and processing a message comprises processing the message structure;

processing one or more next messages in the queue during suspension of the message;

placing the message that was blocked back in the queue when the processing of the message becomes unblocked; and resuming processing of the message that was blocked when the message is reached in the queue.

15. The tangible non-transitory computer-readable medium of claim 14 having stored thereon, computer-executable instructions that, in response to execution by the computing device, cause the computing device to perform operations further comprising processing messages in the queue in a serial manner after processing the message that was blocked.

16. The tangible non-transitory computer-readable medium of claim 14 having stored thereon, computer-executable instructions that, in response to execution by the computing device, cause the computing device to perform operations further comprising wrapping the message in another message intended for special processing, when the processing of the message is unblocked.

17. The tangible non-transitory computer-readable medium of claim 16 having stored thereon, computer-executable instructions that, in response to execution by the computing device, cause the computing device to perform operations further comprising wrapping the message prior to placing the message back in the queue.

18. The tangible non-transitory computer-readable medium of claim 14 having stored thereon, computer-executable instructions that, in response to execution by the computing device, cause the computing device to perform operations further comprising blocking the message while the message calls an external agent during the processing of the message.

19. The tangible non-transitory computer-readable medium of claim 18 having stored thereon, computer-executable instructions that, in response to execution by the computing device, cause the computing device to perform operations wherein an agent is unable to process the message until a reply is received.

20. A computer-implemented method for processing a message queue, comprising:

processing messages in the message queue, wherein a message structure is defined in service descriptions by a message description language and processing a message comprises processing the message structure;

suspending processing of at least a further message that is not in the message queue when the processing of the further message is blocked, the further message having a thread of execution, the further message having been previously removed from the message queue;

processing one or more next messages in the message queue during suspension of the further message;

responsive to the processing of the further message becoming unblocked, wrapping the further message in another message intended for special processing and placing the further message back in the message queue; and resuming processing of the further message.

21. The computer-implemented method of claim 20, wherein the method is performed by a software agent.

22. The computer-implemented method of claim 21 wherein the software agent is configured to optionally send a message to another software agent.

23. The computer-implemented method of claim 20, wherein the processing of the further message is blocked based on at least one of:

a non-reply to the processing of the further message;

an input/output block; or a time-out.

24. The computer-implemented method of claim 20, further comprising receiving a reply from an intended destination, wherein the processing of the further message is unblocked based on receiving the reply.

25. The computer-implemented method of claim 24, wherein the intended destination comprises at least one of:

a software agent; or an input/output port.

26. The computer-implemented method of claim 20, further comprising processing the message intended for special processing which in turn releases the thread of execution of the further message wrapped within the message intended for special processing.

27. The computer-implemented method of claim 20 further comprising continuing processing of messages in the message queue after processing the further message.

28. An article of manufacture including a non-transitory computer-readable medium having instructions stored thereon that, in response to execution by a computing device, cause the computing device to implement a system comprising:

a plurality of message queues;

a plurality of autonomous computer agents, wherein at least one of the autonomous computer agents contains one of the message queues, wherein the autonomous computer agents are configured to:

send self-contained messages to each other from each of their respective message queues;

process the self-contained messages, wherein a self-contained message structure is defined in service descriptions by a message description language and to process a self-contained message comprises processing the self-contained message structure;

suspend processing of at least one of the self-contained messages when processing of the at least one self-contained message is blocked and until an inner send is completed, the at least one self-contained message having a thread of execution, the inner send being a send of a message that originates from within the thread of execution;

wrap the at least one self-contained message that was blocked in another message that is intended for special processing after the inner send is completed; and place the at least one self-contained message back on to one of the message queues for later processing after wrapping the at least one self-contained message, the at least one self-contained message having been previously removed from the one of the message queues.

29. The article of manufacture of claim 28, wherein at least one of the autonomous computer agents are configured to release, once the at least one self-contained message is reached in the one of the message queues, the at least one self-contained message to continue processing.

30. The article of manufacture of claim 29, wherein at least one of the autonomous computer agents is configured to not be blocked during the at least one autonomous computer agent's own call to another autonomous computer agent while ensuring that only one self-contained message is processed at a time.

31. A tangible non-transitory computer-readable medium having stored thereon, computer-executable instructions that, in response to execution by a computing device, cause the computing device to perform operations comprising:

suspending processing of at least one message when processing of the message is blocked, the message having a thread of execution, the message having been previously removed from the queue, wherein a message structure is defined in service descriptions by a message description language and processing a message comprises processing the message structure;

processing one or more next messages in the queue during suspension of the message;

wrapping the message that was blocked in another message intended for special processing when the processing of the message becomes unblocked, wherein the message intended for special processing releases the thread of execution of the message;

placing the message that was blocked back in the queue after the message is wrapped; and processing the message that was blocked when the message is reached in the queue.

32. The tangible non-transitory computer-readable medium of claim 31 having stored thereon, computer-executable instructions that, in response to execution by the computing device, cause the computing device to perform operations further comprising processing messages in the queue in a serial manner after processing the message that was blocked.

33. The tangible non-transitory computer-readable medium of claim 31 having stored thereon, computer-executable instructions that, in response responsive to execution by the computing device, cause the computing device to perform operations further comprising calling an external agent during the processing of the message, wherein the message is blocked during the call to the external agent.

34. The tangible non-transitory computer-readable medium of claim 33 having stored thereon, computer-executable instructions that, in response to execution by the computing device, cause the computing device to perform operations wherein an agent is unable to process the message until a reply is received.

* * * * *

UNITED STATES PATENT AND TRADEMARK OFFICE
CERTIFICATE OF CORRECTION

PATENT NO. : 7,844,759 B1
APPLICATION NO. : 11/495053
DATED : November 30, 2010
INVENTOR(S) : Cowin It is certified that error appears in the above-identified patent and that said Letters Patent is hereby corrected as shown below:

Title Page 3, Item (56), under "Other Publications" in Column 1, Line 9, delete "Inteligent" and insert -- Intelligent --.

Title Page 3, Item (56), under "Other Publications" in Column 2, Line 69, delete "Framw" and insert -- Frame --.

Title Page 4, Item (56), under "Other Publications" in Column 1, Line 49, delete "yjshu}" and insert -- yjhsu} --.

Title Page 4, Item (56), under "Other Publications" in Column 1, Line 55, delete "Systems"," and insert -- System", --.

Title Page 4, Item (56), under "Other Publications" in Column 2, Line 10, delete "Heterogenous Environments", Der Teschnischen" and insert -- Heterogeneous Environments", Der Technischen --.

Title Page 4, Item (56), under "Other Publications" in Column 2, Line 51, delete "Retreived" and insert -- Retrieved --.

Title Page 4, item (56), under "Other Publications" in Column 2, Line 52, delete ".orq" and insert -- .org --.

Column 2, line 37, delete "send (aMessage)," and insert -- send(aMessage), --.

Column 6, line 27, in Claim 22, delete "claim 21" and insert -- claim 21, --.

Column 8, line 24, in Claim 33, after "response" delete "responsive".

Signed and Sealed this
Third Day of July, 2012

David J. Kappos
*Director of the United States Patent and Trademark Office*